April 1, 1969 W. LUNAU 3,436,675

FEEDBACK STABILIZED AC AMPLIFIER

Filed Dec. 14, 1966 Sheet 1 of 2

United States Patent Office 3,436,675

Patented Apr. 1, 1969

3,436,675

FEEDBACK STABILIZED AC AMPLIFIER

Wigand Lunau, Wulfrath, Germany, assignor to Rheinische Kalksteinwerke GmbH, Wulfrath, Germany
Filed Dec. 14, 1966, Ser. No. 601,751
Claims priority, application Germany, Dec. 14, 1965, R 42,207
Int. Cl. H03f *1/36, 3/36*
U.S. Cl. 330—97 1 Claim

ABSTRACT OF THE DISCLOSURE

A feedback stabilized AC amplifier having feedback circuitry from its output to its input, which feedback exhibits a low resistance to DC signals and a high resistance to AC signals in order to stabilize the operating point of the amplifier.

Figure 1:
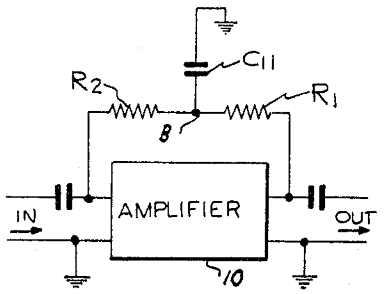

This invention relates to an amplifier for AC voltage.

Electronic amplifiers presently in operation are defective in that they amplify changes which are attributed to the so-called drift of the individual amplifier active elements. Such drift phenomena occur particularly in amplifiers employing semi-conductor elements.

Attempts have been made to eliminate drift manifestations by stabilizing the operating points of the individual amplifying elements. However, particularly for measuring amplifiers with high amplification factors, the required constancy is only partially obtained and then at considerable cost. When the amplifier is subjected to strong temperature variations, a satisfactory control of the stabilization becomes almost impossible, regardless of expense.

I have found that a particularly good stabilization in amplifiers for AC voltages is obtained when, in such amplifiers, means are provided for simultaneously amplifying the AC and DC voltages, and, when primarily DC voltages are used by negative feedback to stabilize the operating points of the individual amplifying elements.

Thus, it is advantageous to make the negative feedback a closed control loop. It is further of advantage to arrange the frequency range (primarily zero frequency as DC) of the negative feedback outside the range of AC voltage frequencies to be amplified.

The amplifier circuit according to the preferred embodiment of the invention uses semi-conductors as amplifying elements because excellent constancy of the operating points is achieved. This arrangement has the further advantage that oscillations of the line voltage remain, within a wide range, without influence on the amplification, and that it is not necessary to stabilize each amplifying element individually.

The amplifier of the invention is particularly suitable for applications which require a highly constant amplification factor, e.g., for the amplification of indicator tube pulses, particularly for proportionality indicator tubes; also, for so-called chopper amplifiers which are employed to amplify DC voltages, and for so-called differential amplifiers. It is also highly suitable for amplifiers used in other measuring circuits.

In order to prevent drift influence in the novel amplifier, the DC voltage is negatively fed back from the amplifier output into the input whereby the AC voltage amplification is, by means of suitable filters, not influenced, or is partially influenced to improve the linearity. This refers to AC feedback, in the method being used to improve the linearity of the amplification. The filters can be designed such that for example, five or ten percent of the amplified alternating voltages are fed back for linearization. This is in addition to the basic stabilizaton effected by the invention. In this way, the drift phenomena of the AC voltage amplifier are reduced approximately by the factor $1/V$=inverse value of the DC voltage amplification, being the amplification factor of the amplifier.

Various circuits embodying the invention are shown in the accompanying drawings:

FIG. 1 shows diagrammatically an amplifier 10 in accordance with the invention. The direct voltage at the amplifier output is negatively fed back over the two resistances $R_1$ and $R_2$ to the amplifier input. The AC voltages are shunted from point B via a condenser $C_{11}$ to earth or ground.

Figure 2:
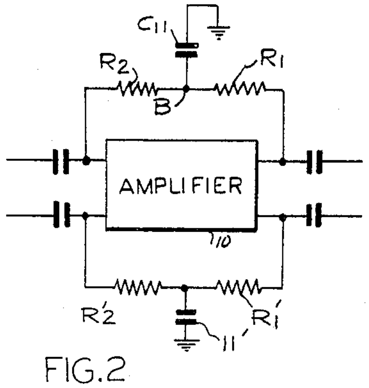

FIG. 2 shows a symmetrical modification of the amplifier of FIG. 1.

Figure 3:
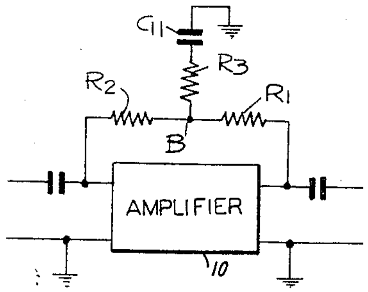

FIG. 3 shows a portion of the amplifier of FIG. 1. The circuit points A and B are given for orientation. Between point B and the condenser $C_{11}$, there is inserted an additional resistance $R_3$ for partial negative feedback of the AC voltages.

Figure 4:
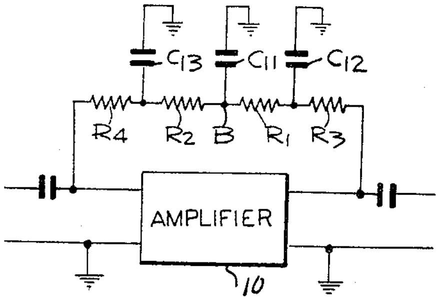

In FIG. 4, the negative feedback takes place over a kind of filter chain, comprising $R_3$, $C_{12}$, $R_1$, $C_{11}$, $R_2$, $C_{13}$, and $R_4$.

In the circuits of FIGS. 1–4, RC or LC members may be provided additionally to increase the effect. This is recommended particularly when the frequency band to be amplified reaches far down to low frequencies.

Figure 5:
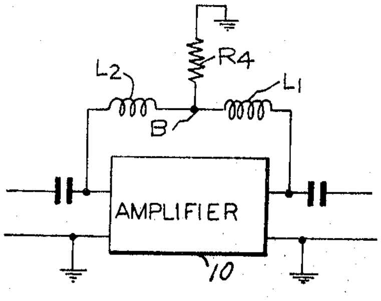

In the negative feed back shown in FIG. 5, the resistances $R_1$ and $R_2$ are replaced by inductances $L_1$ and $L_2$ and the condenser 11 by a resistance $R_4$.

Figure 6:
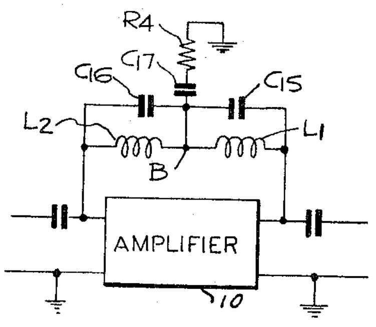

A negative feedback with resonance character, particularly suitable for narrow band amplifier, is shown in FIG. 6. In addition to inductances $L_1$ and $L_2$, the capacitors $C_{15}$ and $C_{16}$ are employed thereacross and $C_{17}$ is inserted in series with resistor $R_4$. The inductances permit the direct current to flow back to the input and at the same time, the inductivity of the coils prevents a return of the AC signal.

Figure 7:
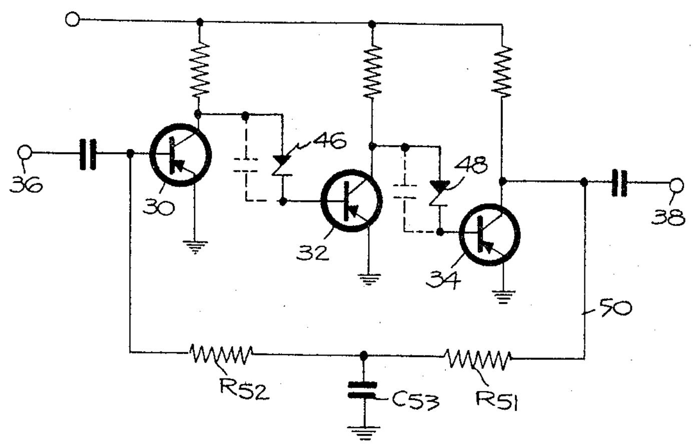
Figure 8:
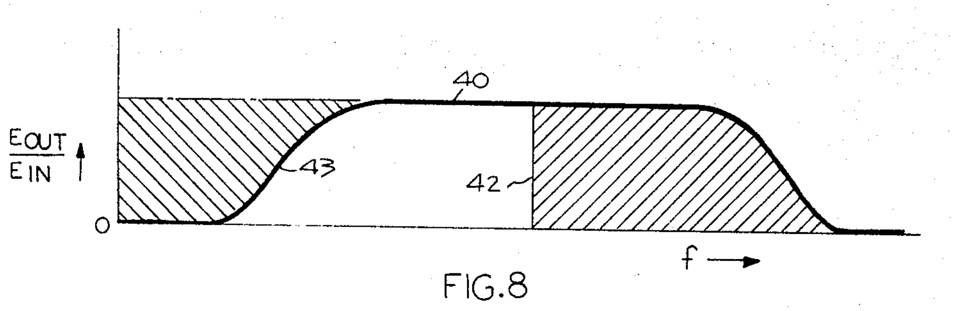

The invention will be more fully understood, as to operation, from a condsideration of FIGS. 7 and 8; FIG. 7 depicting a typical circuit diagram for the amplifier and FIG. 8 graphically representing the amplifier gain characteristics as the frequency increases along the X axis plotted against the ratio of voltage output to voltage input along the Y axis. As may be seen in FIG. 7, a typical amplifier comprising transistors 30, 32 and 34 is shown with input connection 36 and output terminal 38. The amplifier is for alternating current, that is, the alternating current pulses leaving the amplifier constitute the desired signal. However, the direct current amplification in the same amplifier is produced only for the purpose of employing the same via the feedback circuitry for stabilization. Otherwise, the DC component would not be needed at the output of the amplifier.

From FIG. 8, it may be appreciated that the amplifier is operating as a wide band amplifier with the frequency band depending upon the design and connections of the operating components and circuitry. The curve 40 of FIG. 8 may be noted to be substantially constant throughout the largest frequency range and it drops to zero at cut-off frequency. Assume that the region above the vertical line 42 is the useful or the required range for the amplifier. Then, the region 43 may be employed from low frequencies of a few cycles per second to zero or DC frequency for purposes of feedback, without interferring with the required frequency band.

Returning now to FIG. 7, it will be noted that Zener diodes 46 and 48 provide suitable coupling between the individual amplifier stages. These might be replaced by glow discharge tubes when employing electron tubes in wide band amplifiers. Moreover, it should be pointed out that the individual amplifying stages can be equipped alternately with pnp and npn transistors. Also, for simultaneous compensation capacitor members and resistance dividers may be employed as coupling means between the amplifying stages. Finally, cascade circuits can be employed where each stage requires its own operating voltage, all of such coupling methods for wide band amplifiers being conventional.

It may be appreciated that the invention comprises an improvement when at least two amplifying transistors are utilized. Otherwise, it is recommended that for a single amplifying element, known stabilizing methods be followed.

The direct current is produced at the moment when one of the amplifying transistors 30, 32, and 34 changes its operating point. The DC is amplified, together with the AC signal, and returned through the negative feedback circuit (in FIG. 7, lead 50 and resistors $R_{51}$ and $R_{52}$ with capacitor $C_{53}$ being grounded) to the input for transistor 30 to effect stabilization. When the amplifier of FIG. 7 has been stabilized, no direct current is amplified and therefore no direct current flows via the path 50 to the input. It should be pointed out that it is possible, however, to cause a low direct current to flow, intentionally, through the feedback conduit 50, in order to maintain the transistors at a definite operating point.

The three transistor amplifiers of FIG. 7, of course, effect phase inversion and if, for example, due to temperature or voltage changes, the output of transistor 30 becomes more positive, as intended, the output of transistor 52 becomes correspondingly more negative and the output of the third transistor becomes more positive, as intended. These voltage changes are now definitely amplified as direct voltages so that at the amplifier output an increased voltage is available to lead 50. This is returned via the feedback conduit to the input of amplifier 30, such that the voltage input becomes more positive. Because of transistor phase inversion, the positively displaced output voltage of the transistor is decreased.

Between input and output, or more accurately, between the tapping points of the feedback circuit in the amplifier, an angular motion of 180° of the phase has to be produced. This effect can be obtained with even numbered transistors also, when one is connected in such a way that it does not produce a phase reversal, following conventional procedure.

Thus, with the foregoing in mind, it will be seen that an important object of the present invention in avoiding a separate stabilization of each individual amplifier element is achieved.

A typical frequency range for the feedback would run from zero to 100 cycles per second. The frequencies to be amplified might be, for example, between 30 kilocycles and many megacycles.

The circuit may thus be basically regarded as one for stabilizing the voltages; but it also may stabilize the currents, and it depends upon the design of the amplifier which influence is greater. Thus, it is also possible to stabilize against voltage oscillations and against effects of temperature oscillations in accordance with the principles herein taught.

I claim:

1. An AC amplifier comprising an input; an output; a plurality of amplifying means coupled between said input and said output for simultaneously amplifying AC and DC signals; and feedback means coupled with said output and said input and characterized by having a low impedance to DC signals and a high impedance to AC signals in order to stabilize the operating point of said amplifying means, said feedback means including an intermediate point, first inductive means connected between said output and said intermediate point, second inductive means connected between said intermediate point and said input, first capacitive means connected in parallel with said first inductive means, second capacitive means connected in parallel with said second inductive means, and resistive means connected between said intermediate point and ground.

References Cited

UNITED STATES PATENTS

| | | | |
|---|---|---|---|
| 1,966,696 | 7/1934 | Vincent | 331—142 X |
| 2,298,177 | 10/1942 | Scott | 333—704 XR |
| 3,257,631 | 6/1966 | Evans | 330—28 X |
| 3,260,946 | 7/1966 | Beres et al. | 330—28 X |
| 3,260,949 | 7/1966 | Vuorhoeve | 330—28 X |

OTHER REFERENCES

Bertoya, "A Transistor Amplifier with D.C. and A.C. Feedbasic Stabilization," Electronic Engineering, April 1964, pp. 240—245.

JOHN KOMINSKI, *Primary Examiner.*

JAMES B. MULLINS, *Assistant Examiner.*

U.S. Cl. X.R.

330—25, 109, 28, 21